(12) United States Patent
Pettit et al.

(10) Patent No.: US 8,431,285 B2
(45) Date of Patent: Apr. 30, 2013

(54) EDGE DESIGN FOR EPTFE-REINFORCED MEMBRANES FOR PEM FUEL CELLS

(75) Inventors: William H. Pettit, Rochester, NY (US); Michael K. Budinski, Pittsford, NY (US); Wenbin Gu, Pittsford, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 1959 days.

(21) Appl. No.: 11/592,581

(22) Filed: Nov. 3, 2006

(65) Prior Publication Data

US 2008/0107927 A1     May 8, 2008

(51) Int. Cl.
*H01M 8/10*     (2006.01)

(52) U.S. Cl.
USPC .................... 429/483; 429/479; 429/481

(58) Field of Classification Search ............ 429/33, 429/160
See application file for complete search history.

(56) References Cited

U.S. PATENT DOCUMENTS

| | | | |
|---|---|---|---|
| 4,954,388 A | 9/1990 | Mallouk | |
| 6,475,656 B1* | 11/2002 | Koschany et al. | 429/483 |
| 2003/0003340 A1* | 1/2003 | Honma et al. | 429/33 |
| 2006/0029850 A1 | 2/2006 | Szrama | |
| 2006/0128557 A1* | 6/2006 | MacKinnon et al. | 502/101 |
| 2009/0053576 A1* | 2/2009 | Wu | 429/33 |

FOREIGN PATENT DOCUMENTS

JP     2006-100267 A     4/2006

* cited by examiner

*Primary Examiner* — Ula C Ruddock
*Assistant Examiner* — Patricia Davis
(74) *Attorney, Agent, or Firm* — John A. Miller; Miller IP Group, PLC

(57) ABSTRACT

Edge designs, especially for ePTFE-reinforced membranes for proton exchange membrane (PEM) fuel cells, wherein the designs provide a proton barrier at the electrode edge of the PEM fuel cell membrane electrode assembly (MEA) to provide, among other things, resistance to membrane chemical degradation. A portion of the ePTFE layer is imbibed with a proton-impermeable polymer at the electrode edge. The polymer can include, without limitation, B-staged epoxides, B-staged phenolics, hot melt thermoplastics, and/or thermosets or thermoplastics cast from liquid dispersions.

17 Claims, 2 Drawing Sheets

EDGE DESIGN FOR EPTFE-REINFORCED MEMBRANES FOR PEM FUEL CELLS

FIELD OF THE INVENTION

The present invention relates generally to fuel cells and more particularly to improved edge designs of ePTFE-reinforced membranes for PEM fuel cells.

BACKGROUND OF THE INVENTION

Fuel cells have been used as a power source in many applications. For example, fuel cells have been proposed for use in electrical vehicular power plants to replace internal combustion engines. In proton exchange membrane (PEM)-type fuel cells, hydrogen is supplied to the anode of the fuel cell and oxygen is supplied as the oxidant to the cathode. PEM fuel cells include a membrane electrode assembly (MEA) comprising a thin, proton transmissive, non-electrically conductive solid polymer electrolyte membrane having the anode catalyst on one of its faces and the cathode catalyst on the opposite face. The MEA is sandwiched between a pair of electrically conductive elements, sometimes referred to as the gas diffusion media components, that: (1) serve as current collectors for the anode and cathode; (2) contain appropriate openings therein for distributing the fuel cell's gaseous reactants over the surfaces of the respective anode and cathode catalysts; (3) remove product water vapor or liquid water from electrode to flow field channels; (4) are thermally conductive for heat rejection; and (5) have mechanical strength. The term fuel cell is typically used to refer to either a single cell or a plurality of cells (e.g., a stack) depending on the context. A plurality of individual cells are commonly bundled together to form a fuel cell stack and are commonly arranged in series. Each cell within the stack comprises the MEA described earlier, and each such MEA provides its increment of voltage.

In PEM fuel cells, hydrogen ($H_2$) is the anode reactant (i.e., fuel) and oxygen is the cathode reactant (i.e., oxidant). The oxygen can be either a pure form ($O_2$), or air (a mixture of $O_2$ and $N_2$). The solid polymer electrolytes are typically made from ion exchange resins such as perfluoronated sulfonic acid. The anode/cathode typically comprises finely divided catalytic particles, which are often supported on carbon particles, and mixed with a proton conductive resin. The catalytic particles are typically costly precious metal particles. These membrane electrode assemblies are relatively expensive to manufacture and require certain conditions, including proper water management and humidification, and control of catalyst fouling constituents such as carbon monoxide (CO), for effective operation.

Examples of technology related to PEM and other related types of fuel cell systems can be found with reference to commonly-assigned U.S. Pat. No. 3,985,578 to Witherspoon et al.; U.S. Pat. No. 5,272,017 to Swathirajan et al.; U.S. Pat. No. 5,624,769 to Li et al.; U.S. Pat. No. 5,776,624 to Neutzler; U.S. Pat. No. 6,103,409 to DiPierno Bosco et al.; U.S. Pat. No. 6,277,513 to Swathirajan et al.; U.S. Pat. No. 6,350,539 to Woods, III et al.; U.S. Pat. No. 6,372,376 to Fronk et al.; U.S. Pat. No. 6,376,111 to Mathias et al.; U.S. Pat. No. 6,521,381 to Vyas et al.; U.S. Pat. No. 6,524,736 to Sompalli et al.; U.S. Pat. No. 6,528,191 to Senner; U.S. Pat. No. 6,566,004 to Fly et al.; U.S. Pat. No. 6,630,260 to Forte et al.; U.S. Pat. No. 6,663,994 to Fly et al.; U.S. Pat. No. 6,740,433 to Senner; U.S. Pat. No. 6,777,120 to Nelson et al.; U.S. Pat. No. 6,793,544 to Brady et al.; U.S. Pat. No. 6,794,068 to Rapaport et al.; U.S. Pat. No. 6,811,918 to Blunk et al.; U.S. Pat. No. 6,824,909 to Mathias et al.; U.S. Patent Application Publication Nos. 2004/0229087 to Senner et al.; 2005/0026012 to O'Hara; 2005/0026018 to O'Hara et al.; and 2005/0026523 to O'Hara et al., the entire specifications of all of which are expressly incorporated herein by reference.

A proton barrier is typically required at the electrode edge of a PEM fuel cell MEA to ensure resistance to membrane chemical degradation, as well as prevent gas diffusion media fiber penetration into any exposed areas of the membrane. Many structures have been considered for this purpose. Examples of these structures include: (1) with respect to the catalyst, edge portions of catalyst layers imbibed with a low viscosity polymer (e.g., such as 100% solids such as but not limited to epoxy, poly (dimethyl siloxane) (PDMS), phenolic, polyurethane, polyvinyl acetate, and alkyd resin) and/or use of a poison catalytic reaction, e.g., selectively poison to form a functional gradient (e.g., remove platinum from the catalyst at the edge); (2) with respect to the membrane, selective crosslink to tie up sulfonic acid (e.g., $BA(OH)_2$ crosslink), selective desulfonation of a portion of the membrane adjacent to the edge portions of the catalyst layers, and/or selective sulfonation in the active area; (3) with respect to the subgasket (i.e., at the catalyst layer/membrane interface), use a hot-pressed 3 micrometer polyimide film, use an epoxy-bonded polymer film (e.g., b-stage epoxy on sides to allow bonding during hot-pressing), and/or use an inorganic layer such as an intermetallic compound or metallized layer (e.g., directly to the membrane or applied to the polymer film); with respect to the subgasket (i.e., at the diffusion medium/catalyst layer interface), use a solvent-screen print onto the diffusion medium (e.g., poly(vinylidene chloride) (PVDC)-poly (acrylonitrile) (PAN) copolymer), use hot melt films applied between the diffusion medium and the catalyst layer, and/or imbibing the catalyst layer; and (5) with respect to the subgasket (i.e., at the middle of the membrane), use a polyimide/perfluorocarbon sulfonic acid (PFSA) membrane bi-laminate and/or use a polyimide-reinforced membrane.

Unfortunately, these types of proton barrier structures are rather difficult and expensive to construct, and have not produced entirely satisfactory results. Accordingly, there exists a need for new and improved edge designs, especially for ePTFE-reinforced membranes for PEM fuel cells, wherein the designs provide a proton barrier at the electrode edge of the PEM fuel cell MEA to provide resistance to membrane chemical degradation.

SUMMARY OF THE INVENTION

In accordance with a first embodiment, a membrane electrode assembly is provided, comprising: (1) first and second spaced and opposed electrode members, wherein the first electrode member includes a first edge portion, wherein the second electrode member includes a second edge portion; (2) a membrane layer disposed between the first and second electrode members; (3) a reinforcement layer disposed within the membrane layer; and (4) a proton impermeable layer disposed within the reinforcement layer, wherein the proton impermeable layer extends along a portion of the reinforcement layer parallel to the first and second edge portions.

In accordance with a first alternative embodiment, a membrane electrode assembly is provided, comprising: (1) first and second spaced and opposed electrode members, wherein the first electrode member includes a first edge portion, wherein the second electrode member includes a second edge portion; (2) an ionomeric membrane layer disposed between the first and second electrode members; (3) an expanded polytetrafluoroethylene reinforcement layer disposed within the membrane layer; and (4) a proton impermeable layer disposed within the reinforcement layer, wherein the proton impermeable layer extends along a portion of the expanded polytetrafluoroethylene reinforcement layer parallel to the first and second edge portions.

In accordance with a second alternative embodiment, a membrane electrode assembly is provided, comprising: (1) first and second spaced and opposed electrode members, wherein the first electrode member includes a first edge portion, wherein the second electrode member includes a second edge portion; (2) an ionomeric membrane layer disposed between the first and second electrode members, wherein the ionomeric membrane layer extends parallel to the first and second edge portions; (3) an expanded polytetrafluoroethylene reinforcement layer disposed within the ionomeric membrane layer; and (4) a proton impermeable layer disposed within the expanded polytetrafluoroethylene reinforcement layer, wherein the proton impermeable layer is comprised of a material selected from the group consisting of B-staged epoxides, B-staged phenolics, hot melt thermoplastics, thermosets or thermoplastics cast from liquid dispersion, and combinations thereof, wherein the proton impermeable layer extends along a portion of the expanded polytetrafluoroethylene reinforcement layer parallel to the first and second edge portions from a point prior to the start of the first and second edge portions to a point after the end of the first and second edge portions.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE EMBODIMENTS

The following description of the embodiment of the invention is merely exemplary in nature and is in no way intended to limit the invention, its application, or uses.

Figure 1:
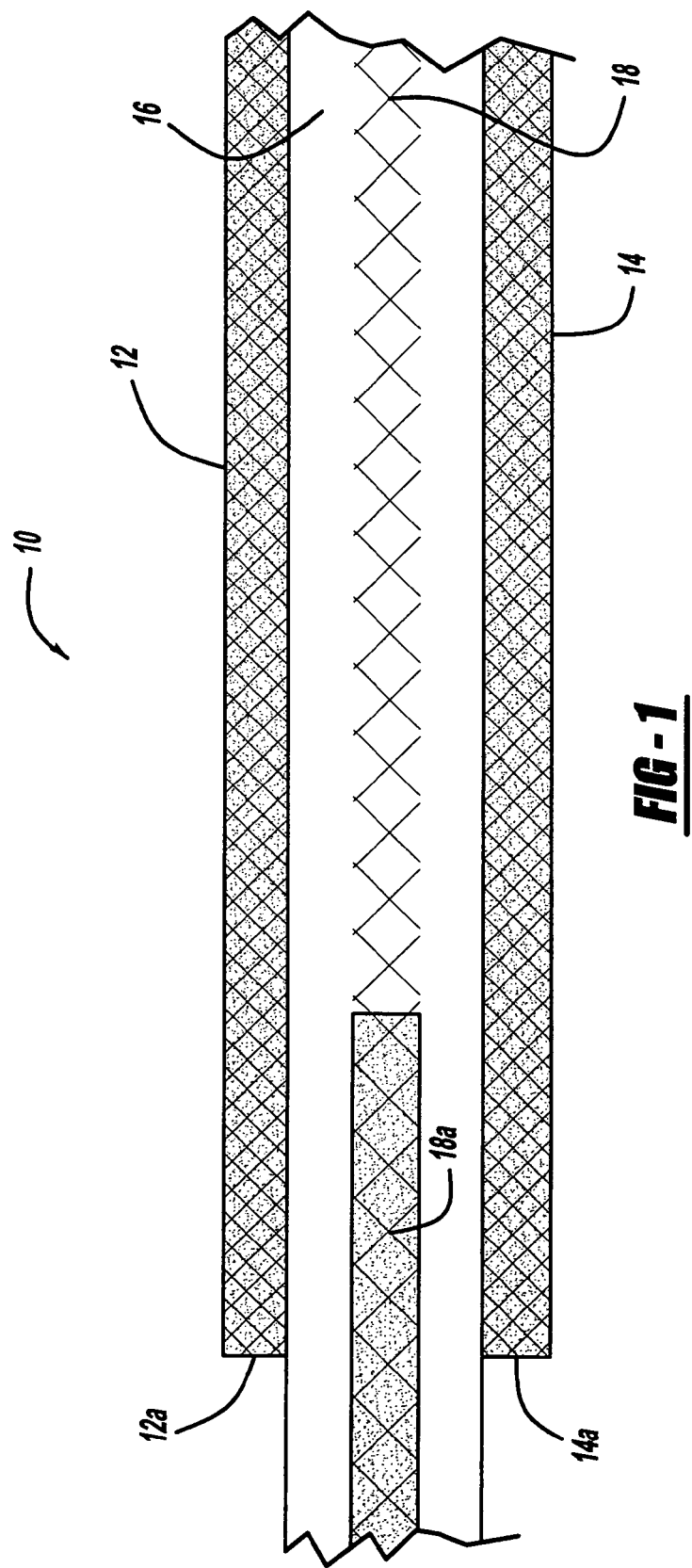
FIG. 1 is a schematic view of a membrane electrode assembly, in accordance with the general teachings of the present invention.

Referring to FIG. 1, there is shown a schematic view of a membrane electrode assembly 10, in accordance with the general teachings of the present invention. The membrane electrode assembly 10 includes two spaced and opposed electrode layers 12 and 14, respectively, such as cathode and/or anode layers. The electrode layers 12 and 14, respectively, are provided with edge portions 12a and 14a, respectively.

Disposed between the electrode layers 12 and 14 is a membrane layer 16, such as, but not limited to, an ionomer membrane layer. A reinforcing layer 18, such as, but not limited to, ePFTE is disposed within and imbibed by the ionomer material of the membrane layer 16. The reinforcing layer 18 includes an imbibed portion 18a, wherein the reinforcing layer 18 is imbibed with a proton-impermeable polymer in the vicinity of the edge portions 12a and 14a, respectively, of the electrode layers 12 and 14, respectively. In accordance with one aspect of the present invention, the imbibed portion 18a extends from a point before the beginning of the edge portions 12a and 14a, respectively, and extends along the reinforcing layer 18 past the end of the edge portions 12a and 14a, respectively, as specifically shown in FIG. 1.

In one non-limiting embodiment, the imbibed portion 18a extends at least a distance of about the thickness of the membrane layer 16 from the edge portions 12a and 14a between the electrode layers 12 and 14, and preferably, about three times the thickness of the membrane layer 16. By providing the imbibed portion 18a between the electrode layers 12 and 14 some distance from the edge portions 12a and 14a, the degradation of the polymer in the membrane layer 16 from hydroxyls generated by the electro-chemical reaction can be reduced. For those membranes that include hydroxyl mitigating additives, the extension of the imbibed portion 18a between the electrode layers 12 and 14 may be limited.

The proton-impermeable polymer can be comprised of materials selected from the group consisting of B-staged epoxides, B-staged phenolics, hot melt thermoplastics, thermosets or thermoplastics cast from liquid dispersion, and combinations thereof.

The present invention provides many benefits over the prior art, including but not limited to: (1) reduced mechanical singularities at interface; (2) lower costs (material and manufacturing); (3) easier manufacturing; (4) reduced thickness variation at the edge; and (5) reduced risk of delamination.

Figure 2:
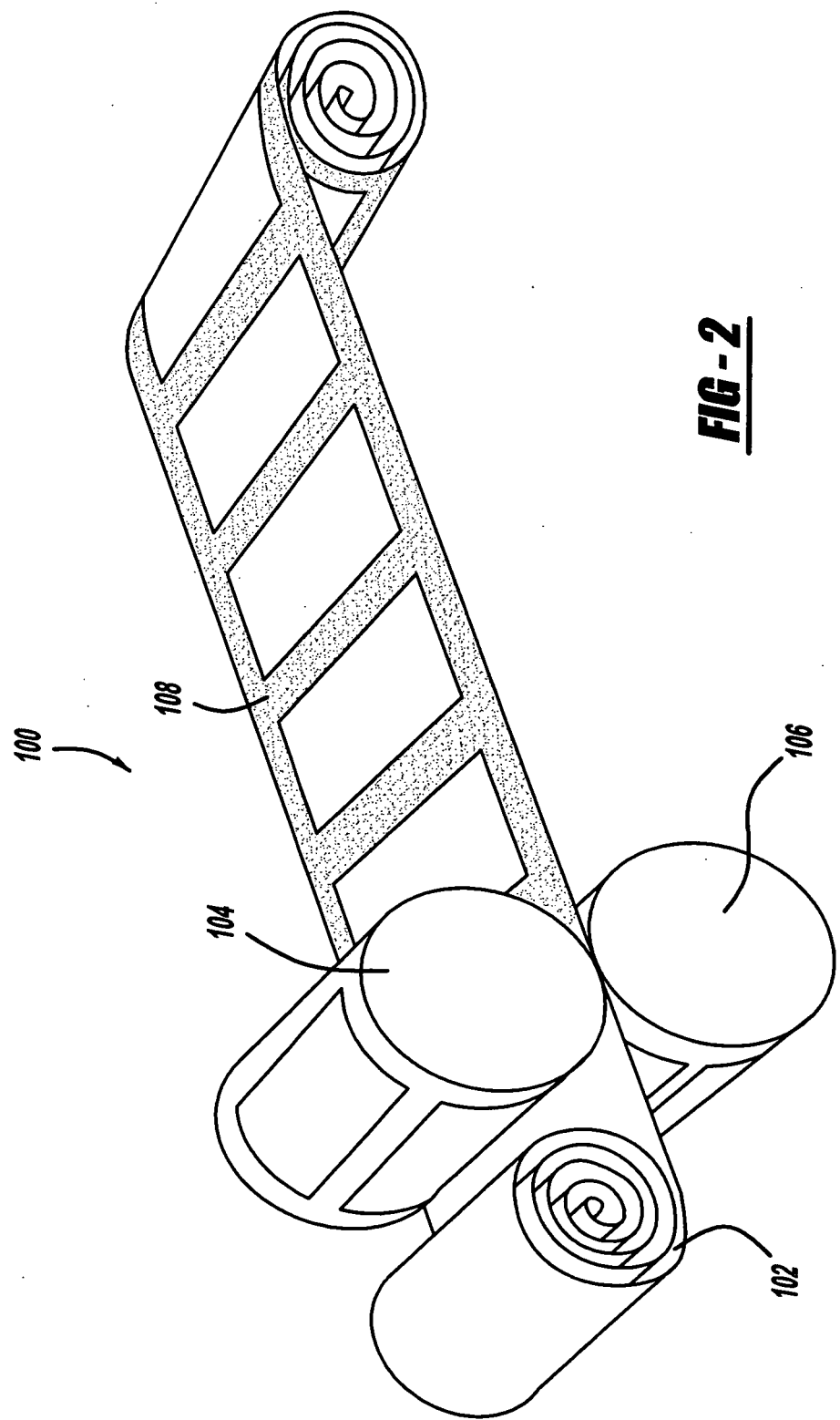
FIG. 2 is a perspective view of an apparatus for applying a proton-impermeable polymer liquid dispersion to an ePTFE ionomer membrane, in accordance with the general teachings of the present invention.

Referring to FIG. 2, there is shown a perspective view of an apparatus 100 for applying a proton-impermeable polymer liquid dispersion to an ePTFE ionomer membrane, in accordance with the general teachings of the present invention.

A plasma-treated ePTFE film 102 is provided as a precursor. Other surface activation methods for the film 102 can also be used instead of plasma treatment, including, but not limited to, corona treatment, sodium naphthalate etching, etc., possibly in conjunction with adhesion promoters, coupling agents or surface active agents. Also, any suitable compatible reinforcement film can be used instead of ePTFE. The film 102 is typically 6 micrometer thick, although other thicknesses can be used in the practice of the present invention. The film 102 is fed through a pair of rollers 104, 106, respectively, that are operable to apply a proton impermeable polymer, as described above, to the surface of the film 102. It should be appreciated that the proton impermeable polymer can be applied by several processes, including but not limited to, gravature, screen printing, dispensing, pad printing, and/or the like.

In this manner, the border portion 108 of the film 102 is impregnated with proton impermeable polymer. The thus treated and impregnated ePFTE-reinforced film 102 can then used to make a conventional PFSA membrane, or any other hydrocarbon-based membrane.

The description of the invention is merely exemplary in nature and, thus, variations that do not depart from the gist of the invention are intended to be within the scope of the invention. Such variations are not to be regarded as a departure from the spirit and scope of the invention.

What is claimed is:
1. A membrane electrode assembly comprising:
first and second spaced and opposed electrode members;
wherein the first electrode member includes a first edge portion;
wherein the second electrode member includes a second edge portion;

a membrane layer disposed between the first and second electrode members;

a reinforcement layer disposed within the membrane layer; and a proton impermeable layer disposed within the reinforcement layer;

wherein the proton impermeable layer extends along a portion of the reinforcement layer and is absorbed within the reinforcement layer between the first and second electrode members and proximate to the first and second edge portions.

2. The membrane electrode assembly according to claim 1 wherein the membrane layer includes an ionomeric material.

3. The membrane electrode assembly according to claim 1 wherein the reinforcement layer includes an expanded polytetrafluoroethylene.

4. The membrane electrode assembly according to claim 1 wherein the proton impermeable layer is comprised of a material selected from the group consisting of B-staged epoxies, B-staged phenolics, hot melt thermoplastics, thermosets or thermoplastics cast from liquid dispersion, and combinations thereof.

5. The membrane electrode assembly according to claim 1 wherein the proton impermeable layer extends from a point prior to the start of the first and second edge portions to a point after the end of the first and second edge portions.

6. The membrane electrode assembly according to claim 1 wherein the proton impermeable layer extends between the electrode members from the first and second edge portions to a distance of at least the thickness of the membrane layer.

7. The membrane electrode assembly according to claim 6 wherein the proton impermeable layer extends between the electrode members from the first and second edge portions to a distance of about three times the thickness of the membrane layer.

8. The membrane electrode assembly according to claim 1 wherein the membrane electrode assembly is part of a fuel cell.

9. A membrane electrode assembly comprising:
first and second spaced and opposed electrode members;
wherein the first electrode member includes a first edge portion;
wherein the second electrode member includes a second edge portion;
an ionomeric membrane layer disposed between the first and second electrode members;
a reinforcement layer disposed within the membrane layer; and
a proton impermeable layer disposed within the reinforcement layer;
wherein the proton impermeable layer extends along a portion of the reinforcement layer and is absorbed within the reinforcement layer some distance between the first and second electrode members.

10. The membrane electrode assembly according to claim 9 wherein the proton impermeable layer is comprised of a material selected from the group consisting of B-staged epoxies, B-staged phenolics, hot melt thermoplastics, thermosets or thermoplastics cast from liquid dispersion, and combinations thereof.

11. The membrane electrode assembly according to claim 9 wherein the proton impermeable layer extends between the electrode members from the first and second edge portions to a distance of at least the thickness of the membrane layer.

12. The membrane electrode assembly according to claim 11 wherein the proton impermeable layer extends between the electrode members from the first and second edge portions to a distance of about three times the thickness of the membrane layer.

13. The membrane electrode assembly according to claim 9 wherein the reinforcement layer includes an expanded polytetrafluoroethylene.

14. The membrane electrode assembly according to claim 11 wherein the membrane electrode assembly is part of a fuel cell.

15. A membrane electrode assembly for a fuel cell, said membrane electrode assembly comprising:
first and second spaced and opposed electrode members;
wherein the first electrode member includes a first edge portion;
wherein the second electrode member includes a second edge portion;
an ionomeric membrane layer disposed between the first and second electrode members;
an expanded polytetrafluoroethylene reinforcement layer disposed within the ionomeric membrane layer; and
a proton impermeable layer disposed within the expanded polytetrafluoroethylene reinforcement layer;
wherein the proton impermeable layer is comprised of a material selected from the group consisting of B-staged epoxies, B-staged phenolics, hot melt thermoplastics, thermosets or thermoplastics cast from liquid dispersion, and combinations thereof;
wherein the proton impermeable layer extends along a portion of the expanded polytetrafluoroethylene reinforcement layer and is absorbed by the expanded polytetrafluoroethylene reinforcement layer between the first and second electrode members.

16. The membrane electrode assembly according to claim 15 wherein the proton impermeable layer extends between the electrode members from the first and second edge portions to a distance of at least the thickness of the membrane layer.

17. The membrane electrode assembly according to claim 16 wherein the proton impermeable layer extends between the electrode members from the first and second edge portions to a distance of about three times the thickness of the membrane layer.

* * * * *